United States Patent
Lai et al.

(10) Patent No.: US 12,498,573 B2
(45) Date of Patent: Dec. 16, 2025

(54) HEAD-MOUNTED DISPLAY, CONTROLLING METHOD AND NON-TRANSITORY COMPUTER READABLE STORAGE MEDIUM THEREOF

(71) Applicant: HTC Corporation, Taoyuan (TW)

(72) Inventors: Chao-Hsiang Lai, Taoyuan (TW); Cheng-Han Hsieh, Taoyuan (TW); Tzu-Wei Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 504 days.

(21) Appl. No.: 18/058,876

(22) Filed: Nov. 28, 2022

(65) Prior Publication Data

US 2024/0176143 A1  May 30, 2024

(51) Int. Cl.
*G02B 27/01* (2006.01)
*G06F 3/01* (2006.01)
*G06F 3/0484* (2022.01)

(52) U.S. Cl.
CPC ..... *G02B 27/0172* (2013.01); *G02B 27/0179* (2013.01); *G06F 3/012* (2013.01); *G06F 3/013* (2013.01); *G06F 3/0484* (2013.01); *G02B 2027/0138* (2013.01); *G02B 2027/0187* (2013.01)

(58) Field of Classification Search
CPC ............ G02B 27/0172; G02B 27/0179; G02B 2027/0138; G02B 2027/0187; G06F 3/012; G06F 3/013; G06F 3/0484
See application file for complete search history.

(56) References Cited

U.S. PATENT DOCUMENTS

| | | | | |
|---|---|---|---|---|
| 2019/0324539 | A1* | 10/2019 | Wu | G06F 3/016 |
| 2019/0362562 | A1* | 11/2019 | Benson | G06V 10/82 |
| 2020/0329229 | A1* | 10/2020 | Chen | G06T 7/74 |
| 2021/0239993 | A1 | 8/2021 | Wan et al. | |
| 2023/0267578 | A1* | 8/2023 | Fan | G06T 5/80 |
| | | | | 345/647 |

FOREIGN PATENT DOCUMENTS

| | | |
|---|---|---|
| CN | 111061363 A | 4/2020 |
| CN | 112789577 A | 5/2021 |
| CN | 114879844 A | 8/2022 |
| TW | 202015400 A | 4/2020 |

OTHER PUBLICATIONS

The office action of the corresponding Taiwanese application No. TW112141548 issued on Jul. 11, 2024.

* cited by examiner

*Primary Examiner* — John R Wallace
(74) *Attorney, Agent, or Firm* — CKC & Partners Co., LLC (57) ABSTRACT

A head-mounted display, controlling method, and non-transitory computer readable storage medium thereof are provided. The head-mounted display determines a first posture among a plurality of postures based on a plurality of real-time images. The head-mounted display generates a first gesture among a plurality of gestures corresponding to a user according to a plurality of inertial measurement parameters corresponding to a first body part of the user. The head-mounted display generates a control signal corresponding to a first output event among a plurality of output events based on the first gesture and the first gesture.

18 Claims, 8 Drawing Sheets

HEAD-MOUNTED DISPLAY, CONTROLLING METHOD AND NON-TRANSITORY COMPUTER READABLE STORAGE MEDIUM THEREOF

BACKGROUND

Field of Invention

The present invention relates to a head-mounted display, controlling method, and non-transitory computer readable storage medium thereof. More particularly, the present invention relates to a head-mounted display, controlling method, and non-transitory computer readable storage medium thereof for generating a control signal through the operation of a wearable device and a head-mounted display.

Description of Related Art

In recent years, various technologies related to virtual reality have developed rapidly, and various technologies and applications of head-mounted displays have been proposed one after another.

In the prior art, in a situation where a user wears an inside-out head-mounted display that tracks positioning, the user can input data (e.g., input the text) or perform corresponding control (e.g., input the command) by operating the physical buttons on the handheld controller.

However, in such the situation, the user's hand operating the controller may not be able to perform other additional operations. In addition, since the user needs to operate the physical buttons on the handheld controller, it is usually difficult for the user to quickly input the data or perform the corresponding control.

Accordingly, there is an urgent need for a controlling technology that can efficiently provide a user to operate to generate a control signal and does not require the user to hold the controller.

SUMMARY

An objective of the present disclosure is to provide a head-mounted display. The head-mounted display comprises an image capturing device and a processor, and the processor is coupled to the image capturing device. The image capturing device is configured to capture a plurality of real-time images including a wearable device worn on a first body part of a user. The processor determines a first posture among a plurality of postures based on the real-time images. The processor receives a plurality of inertial measurement parameters corresponding to the first body part from the wearable device. The processor generates a first gesture among a plurality of gestures corresponding to the user according to the inertial measurement parameters. The processor generates a control signal corresponding to a first output event among a plurality of output events based on the first posture and the first gesture.

Another objective of the present disclosure is to provide a controlling method, which is adapted for use in an electronic apparatus. The controlling method comprises following steps: analyzing a plurality of real-time images including a wearable device worn on a first body part of a user to determine a first posture among a plurality of postures; generating, according to a plurality of inertial measurement parameters corresponding to the first body part of the user, a first gesture among a plurality of gestures corresponding to the user; and generating a control signal corresponding to a first output event among a plurality of output events based on the first posture and the first gesture to control an application program operating on the electronic apparatus.

A further objective of the present disclosure is to provide a non-transitory computer readable storage medium having a computer program stored therein. The computer program comprises a plurality of codes, the computer program executes a controlling method after being loaded into an electronic apparatus. The controlling method comprises following steps: analyzing a plurality of real-time images including a wearable device worn on a first body part of a user to determine a first posture among a plurality of postures; generating, according to a plurality of inertial measurement parameters corresponding to the first body part of the user, a first gesture among a plurality of gestures corresponding to the user; and generating a control signal corresponding to a first output event among a plurality of output events based on the first posture and the first gesture to control an application program operating on the electronic apparatus.

According to the above descriptions, the controlling technology (at least including the head-mounted display, the method, and the non-transitory computer readable storage medium) provided by the present disclosure generates the corresponding posture and gesture by analyzing real-time images and inertial measurement parameters corresponding to a body part of the user. Next, the present disclosure may generate a control signal corresponding to the output event based on the corresponding posture and gesture. Since the present invention only requires the cooperative operation of the wearable device and the head-mounted display, the user does not need to hold the controller or operate the physical buttons on the controller. Therefore, the control signal generation technology provided by the present invention can improve the efficiency of the user inputting data or inputting control commands when the user wears the head-mounted display.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a head-mounted display, controlling method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
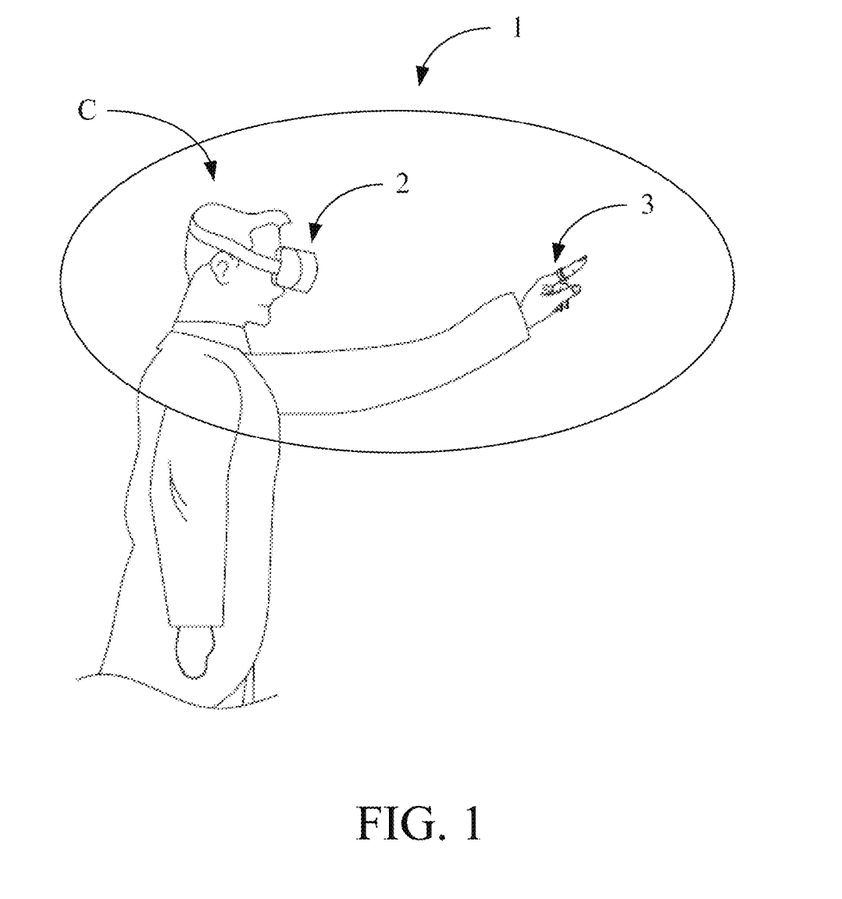
FIG. 1 is a schematic diagram depicting the control signal generating system of the first embodiment.

First, the applicable scene of the present embodiment will be described, and a schematic diagram of which is depicted in FIG. 1. As shown in FIG. 1, in the application environment of the present disclosure, a user C may use a head-mounted display 2, and the user C may wear a wearable device 3 on a body part (e.g., the user C wears a smart ring on the index finger of the left hand) to perform control operations (e.g., applications) corresponding to the display screen of the head-mounted display 2.

In the first embodiment of the present disclosure, the control signal generating system 1 comprises a head-mounted display 2 and a wearable device 3, and the head-mounted display 2 is communicatively connected to the wearable device 3.

Figure 2A:
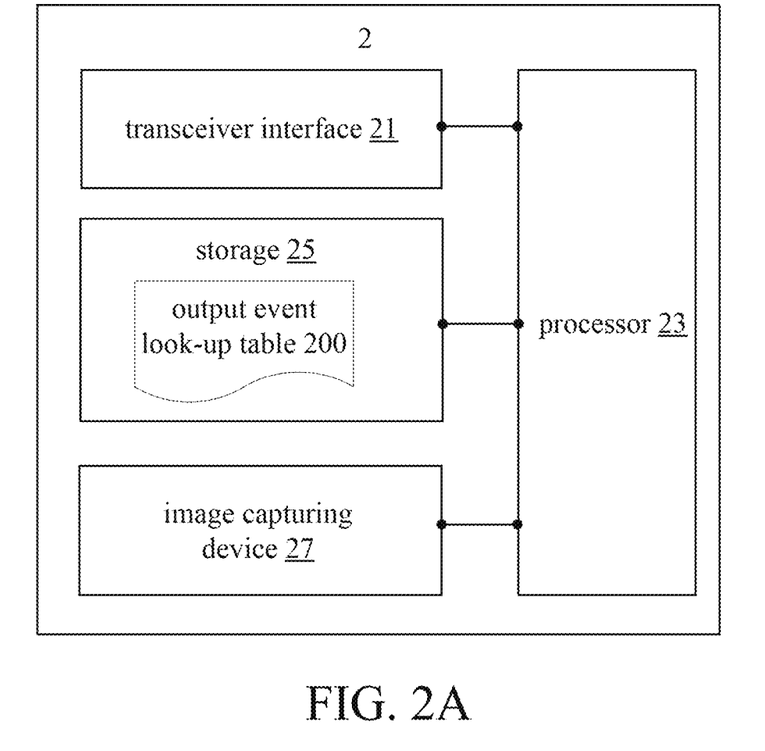
FIG. 2A is a schematic diagram depicting the head-mounted display of some embodiments.

In the present embodiment, a schematic diagram of the structure of the head-mounted display 2 is depicted in FIG. 2A. The head-mounted display 2 comprises a transceiver interface 21, a processor 23, and a storage 25. The processor 23 is coupled to the transceiver interface 21 and the storage 25.

In some embodiments, as shown in FIG. 2A, the head-mounted display 2 may further comprise an image capturing device 27, and the image capturing device 27 is coupled to the processor 23. The image capturing device 27 may comprise a plurality of image capturing units (e.g., a plurality of depth camera lenses) for capturing a plurality of real-time images including the wearable device 3 worn on a first body part of the user C.

In some embodiments, the image capturing device 27 captures the plurality of real-time images corresponding to a field of view (FOV), and the body part (e.g., a second body part referred to in some embodiments) of the user C wearing the wearable device 3 is included in the field of view.

Figure 3:
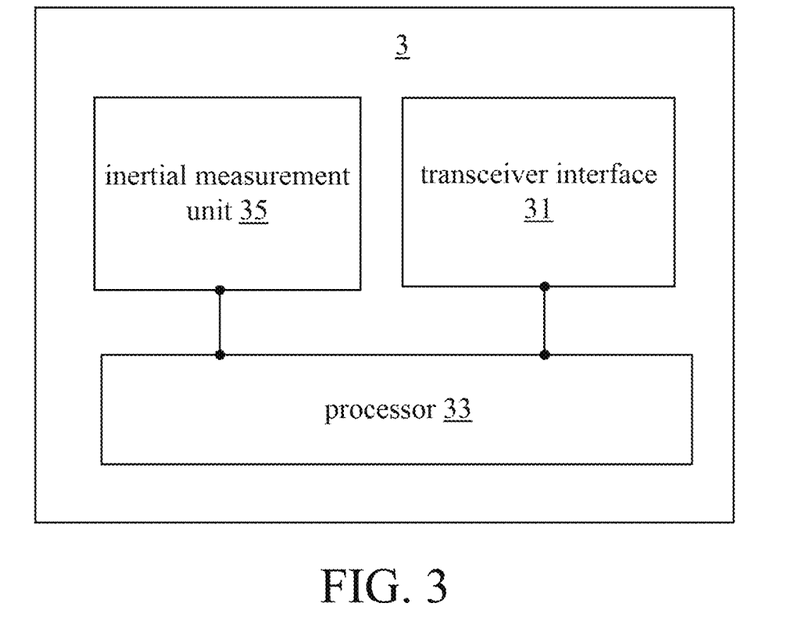
FIG. 3 is a schematic diagram depicting the wearable device of some embodiments.

In addition, in the present embodiment, a schematic diagram of the structure of the wearable device 3 is depicted in FIG. 3. The wearable device 3 comprises a transceiver interface 31, a processor 33, and an inertial measurement unit 35. The processor 33 is coupled to the transceiver interface 31 and the inertial measurement unit 35. The inertial measurement unit 35 is configured to detect the inertial measurement parameters corresponding to the body part (e.g., a first body part referred to in some embodiments) of the user C wearing the wearable device 3.

Specifically, the inertial measurement unit may continuously generate a series of inertial measurement parameters (e.g., a stream of inertial measurement parameters generated at a frequency of 10 times per second), and each of the inertial measurement parameters may comprises an acceleration, an amount of rotation, and an angular acceleration. During operation, the head-mounted display 2 may periodically receive the inertial measurement parameters from the wearable device 3.

It shall be appreciated that the inertial measurement parameters generated by the wearable device 3 may correspond to the body parts of the user C (e.g., the body part of the finger). For example, the user C may wear the wearable device 3 on any finger to collect data. For convenience of description, in the present embodiment, the user C may be described wearing the wearable device 3 on the index finger.

It shall be appreciated that the transceiver interface 21 and the transceiver interface 31 is an interface capable of receiving and transmitting data or other interfaces capable of receiving and transmitting data and known to those of ordinary skill in the art. The transceiver interface can receive data from sources such as external apparatuses, external web pages, external applications, and so on. The processor 23 and the processor 33 may be any of various processors, Central Processing Units (CPUs), microprocessors, digital signal processors or other computing apparatuses known to those of ordinary skill in the art. The storage 25 may be a memory, a Universal Serial Bus (USB) disk, a hard disk, a Compact Disk (CD), a mobile disk, or any other storage medium or circuit known to those of ordinary skill in the art and having the same functionality.

It shall be appreciated that FIG. 1 is merely an example for illustration, and the present disclosure does not limit the content of the control signal generating system 1. For example, the present disclosure does not limit the number of wearable devices 3 connected to the head-mounted display 2. The head-mounted display 2 may be connected to a plurality of wearable devices through the network at the same time, depending on the scale and actual requirements of the control signal generating system 1.

In the present embodiment, the processor 23 determines a first posture among a plurality of postures based on the plurality of real-time images. It shall be appreciated that the postures may be predefined postures, and each of the postures corresponds to a posture of the body part of the user C (i.e., the body part to be analyzed).

Figure 4A:
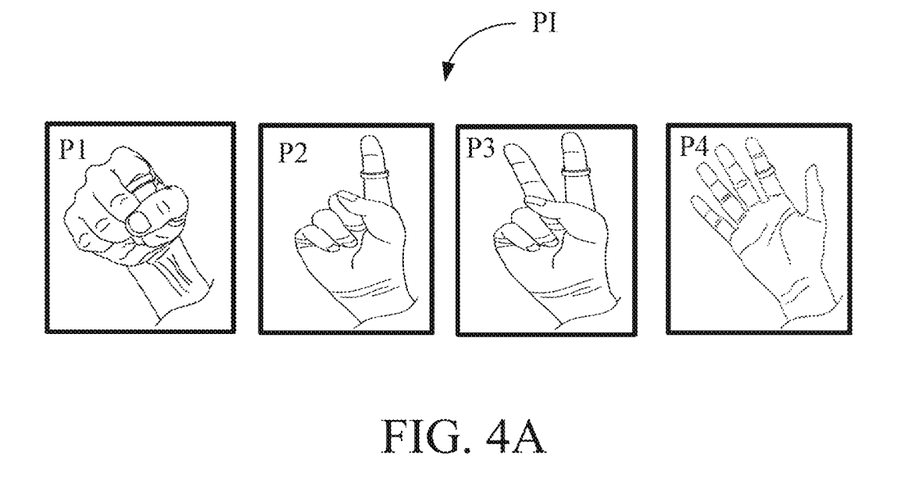
FIG. 4A is a schematic diagram depicting the postures of some embodiments.

For ease of understanding, please refer to the posture schematic diagram PI in FIG. 4A. As shown in FIG. 4A, the posture schematic diagram PI comprises a posture P1 in which the posture is a clenched fist, a posture P2 in which the posture is a clenched first and a raised index finger, a posture P3 in which the posture is a clenched first and the middle finger and the index finger are raised, and a posture P4 in which the palm is open.

In some embodiments, the processor 23 may determine the first posture by comparing a posture tracking trajectory of a second body part of the user C with the postures.

Specifically, the posture tracking trajectory may be calculated by the following operations. The processor 23 analyzes the real-time images to generate a plurality of spatial locations corresponding to the second body part of the user, wherein the spatial locations correspond to a plurality of time intervals. Next, the processor 23 calculates the posture tracking trajectory corresponding to the second body part of the user based on the time intervals and the spatial locations.

In some embodiments, the processor 23 may perform the calculation and analysis of the second body part of the user C through the analysis technology of the human skeleton shape and torque in biomechanics. For example, the processor 23 may determine the angle and position of the finger skeleton of the user C through the posture detection algorithm. When the user C's finger skeleton reaches a predetermined angle and position, it is determined that the user C has acted a corresponding action.

In some embodiments, the real-time images captured by the image capturing device 27 correspond to a field of view, and the second body part of the user is included in the field of view. Furthermore, the real-time images are analyzed to generate a plurality of spatial locations corresponding to the second body part of the user, and a posture tracking trajectory of the second body part of the user is generated based on the plurality of spatial locations and a plurality of time intervals corresponding to the plurality of spatial locations.

Next, in the present embodiment, the processor 23 receives the inertial measurement parameters from the wearable device 3. Then, the processor 23 generates a first gesture among a plurality of gestures corresponding to the user C according to the inertial measurement parameters.

In some embodiments, the processor 23 may input the plurality of inertial measurement parameters into a convolutional neural network (e.g., a trained convolutional neural network) to generate the first gesture corresponding to the user C according to the inertial measurement parameters.

It shall be appreciated that if we take the body part as a finger as an example, the trained convolutional neural network can be a posture classifier. Specifically, the convolutional neural network can be used to analyze the inertial measurement parameters and generate a posture corresponding to the inertial measurement parameters. In some embodiments, the convolutional neural network can be trained with labeled inertial measurement parameter data (e.g., the inertial measurement parameters corresponding to a finger).

Figure 4B:
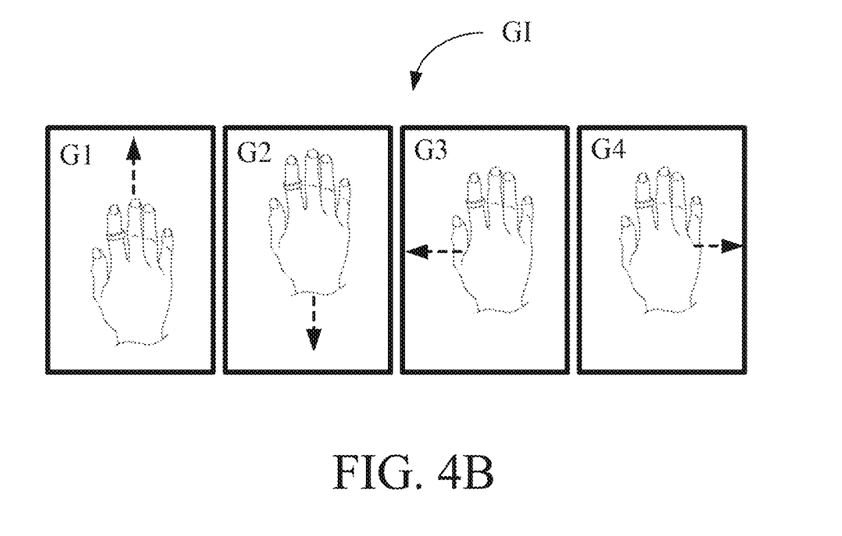
FIG. 4B is a schematic diagram depicting the gestures of some embodiments.

For ease of understanding, please refer to the gesture schematic diagram GI in FIG. 4B, the figure takes the movement of the back of the hand as an example to illustrate. As shown in FIG. 4B, the gesture GI comprises a gesture G1 for moving up, a gesture G2 for moving down, a gesture G3 for moving left, and a gesture G4 for moving right.

In some embodiments, the processor 23 generates the first gesture corresponding to the user C only when the inertial measurement parameters are greater than a predetermined value (i.e., the amount of movement is greater than a preset range).

Finally, in this embodiment, the processor 23 generates a control signal corresponding to a first output event among a plurality of output events based on the first posture and the first gesture. For example, the output event may be an event of switching modes, an event of selecting an option, an event of inputting data, and the like.

Figure 2B:
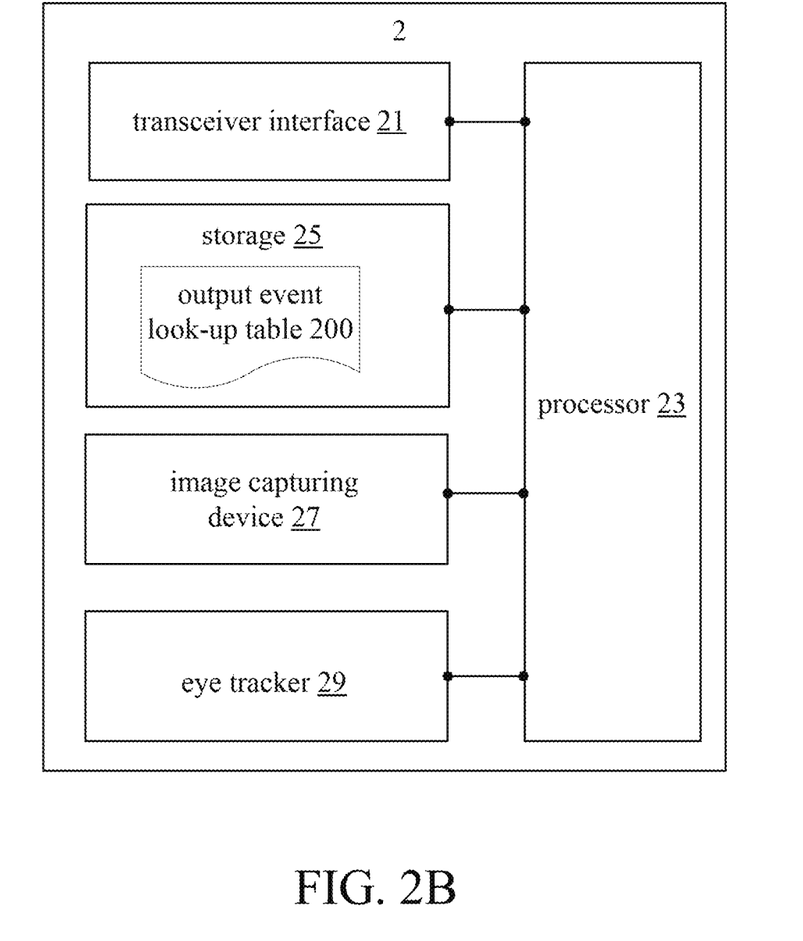
FIG. 2B is a schematic diagram depicting the head-mounted display of some embodiments.

In some embodiments, as shown in FIG. 2A and FIG. 2B, the head-mounted display 2 further stores an output event look-up table 200, and the output event look-up table 200 is configured to indicate the postures and the gestures corresponding to the output events.

Figure 5:
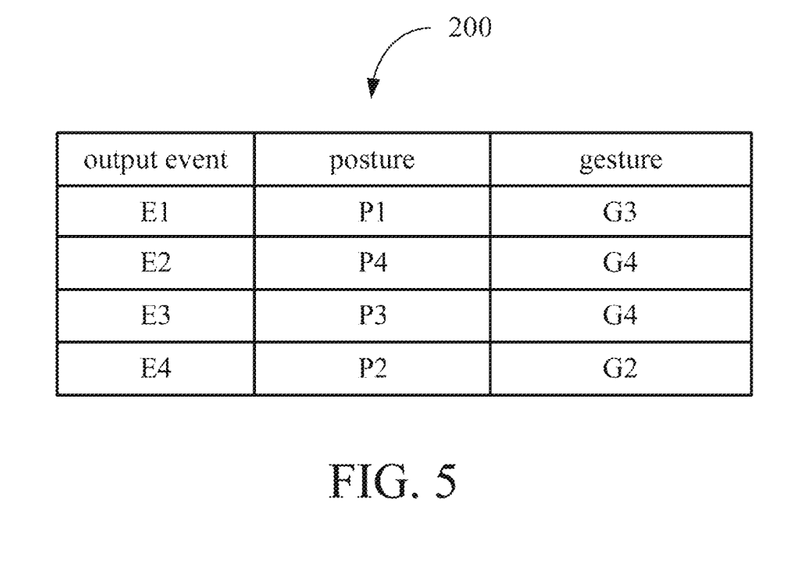
FIG. 5 is a schematic diagram depicting the output event look-up table of some embodiments.

For ease of understanding, please refer to an output event look-up table 200 illustrated in FIG. 5. In FIG. 5, the output event look-up table 200 records that the output event E1 corresponds to the posture P1 and the gesture G3. The output event E2 corresponds to the posture P4 and the gesture G4. The output event E3 corresponds to the posture P3 and the gesture G4. The output event E4 corresponds to the posture P2 and the gesture G2.

In some embodiments, the processor 23 may determine the corresponding output event through the output event look-up table 200. Specifically, the processor 23 compares the first posture and the first gesture with the output event look-up table 200 to determine the first output event corresponding to the first posture and the first gesture. Then, the processor 23 generates the control signal corresponding to the first output event.

In some embodiments, in order to save computing resources and reduce the occurrence of misjudgments, the processor 23 further determines the gesture of the user C only when determining that the posture of the user C meets the conditions. Specifically, the processor 23 first determines whether the postures have the first posture corresponding to the posture tracking trajectory.

In addition, when having the first posture corresponding to the posture tracking trajectory, the processor 23 generates the first gesture corresponding to the user in response to having the first posture corresponding to the posture tracking trajectory network.

In addition, when not having the first posture corresponding to the posture tracking trajectory, the processor 23 will not generate the first gesture corresponding to the user in response to not having the first posture corresponding to the posture tracking trajectory.

In some embodiments, the control signal corresponding to the first output event is used to control an application program operating on the head-mounted display 2, and the first output event corresponds to at least one of a password input operation or a mode switching operation.

In some embodiments, in order to make the determination of the output event more accurate, the head-mounted display 2 may further add the eye movement of the user C as one of the determination conditions. Specifically, as shown in FIG. 2B, the head-mounted display 2 further comprises an eye tracker 29, and the eye tracker 29 is configured to generate an eye trajectory corresponding to the user C. In some embodiments, the head-mounted display 2 may generate the control signal corresponding to the first output event among the output events based on the first posture, the first gesture, and the eye trajectory.

For example, when the processor 23 generates an output event E1 by analyzing the first posture and the first gesture, and the processor 23 further analyzes the eye trajectory indicating that it is pointing to the right (i.e., looking to the right), the processor 23 may further classify the output event into E1_1. In addition, when the processor 23 further analyzes the eye trajectory indicating that it is pointing to the left (i.e., looking to the left), the processor 23 may further classify the output event into E1_2. Therefore, more control signals corresponding to the output events can be distinguished.

In some embodiments, the processor 23 can also be set to generate a corresponding output event when the eye trajectory is in the same direction as a certain body part (e.g., looking at the direction pointed by the finger).

Figure 6:
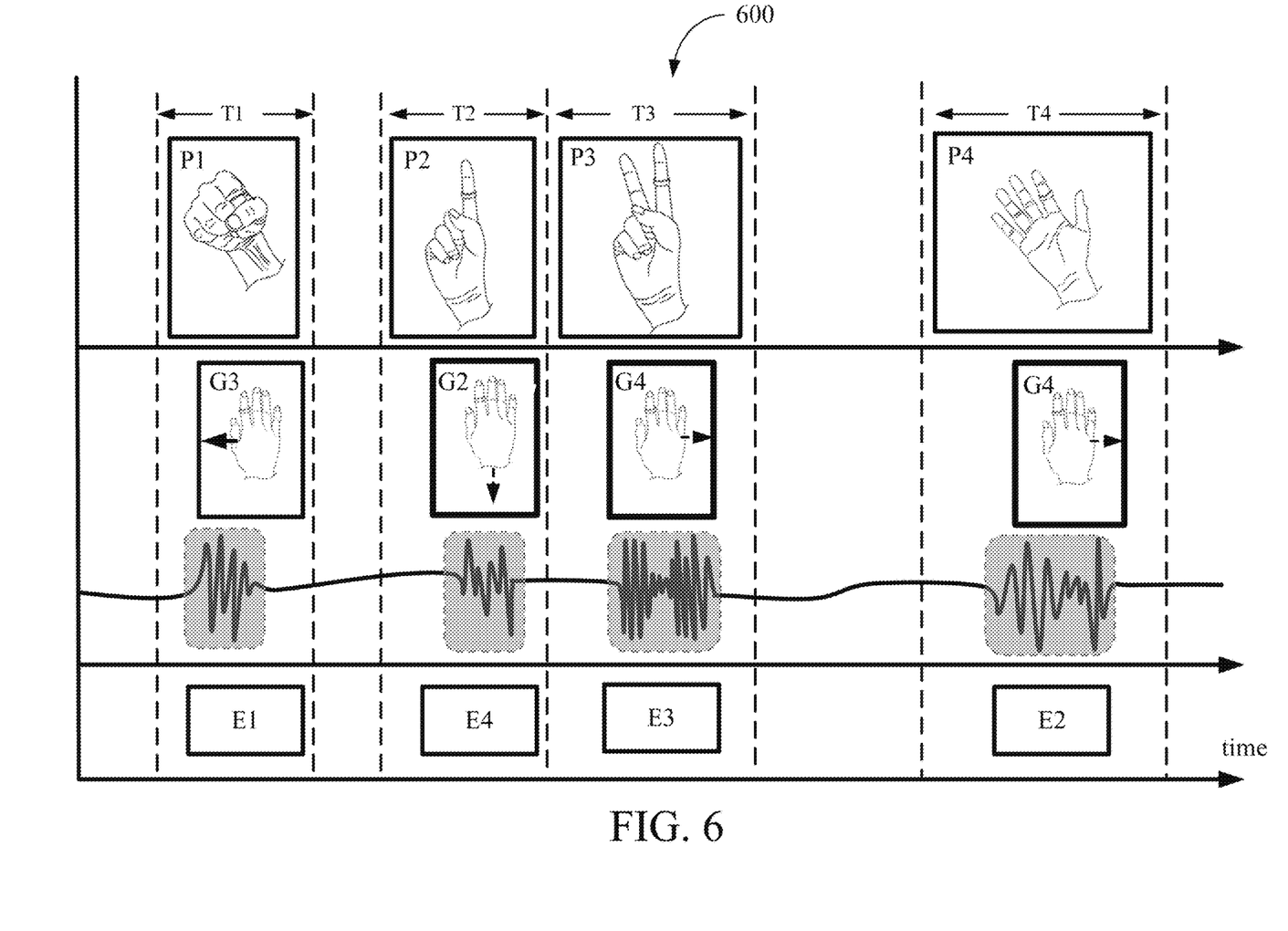
FIG. 6 is a sequence diagram depicting the operations of some embodiments.

For ease of understanding, an actual implementation example is described, please refer to the operations sequence diagram 600 in FIG. 6. In FIG. 6, in the time interval T1, the processor 23 determines that the hand of the user C presents the posture P1 and cooperates with the gesture G3, so the processor 23 generates a control signal corresponding to the output event E1 in the time interval T1. In addition, in the time interval T2, the processor 23 determines that the hand of the user C presents the posture P2 and cooperates with the gesture G2, so the processor 23 generates a control signal corresponding to the output event E4 in the time interval T2.

In addition, in the time interval T3, the processor 23 determines that the hand of the user C presents the posture P3 and cooperates with the gesture G4, so the processor 23 generates a control signal corresponding to the output event E3 in the time interval T3. In addition, in the time interval T4, the processor 23 determines that the hand of the user C presents the posture P4 and cooperates with the gesture G4, so the processor 23 generates a control signal corresponding to the output event E2 in the time interval T4.

According to the above descriptions, the control signal generating system 1 provided by the present disclosure generates the corresponding posture and gesture by analyzing real-time images and inertial measurement parameters corresponding to a body part of the user. Next, the present disclosure may generate a control signal corresponding to the output event based on the corresponding posture and gesture. Since the present invention only requires the cooperative operation of the wearable device and the head-mounted display, the user does not need to hold the controller or operate the physical buttons on the controller. Therefore, the control signal generating system 1 provided by the present invention can improve the efficiency of the user inputting data or inputting control commands when the user wears the head-mounted display.

Figure 7:
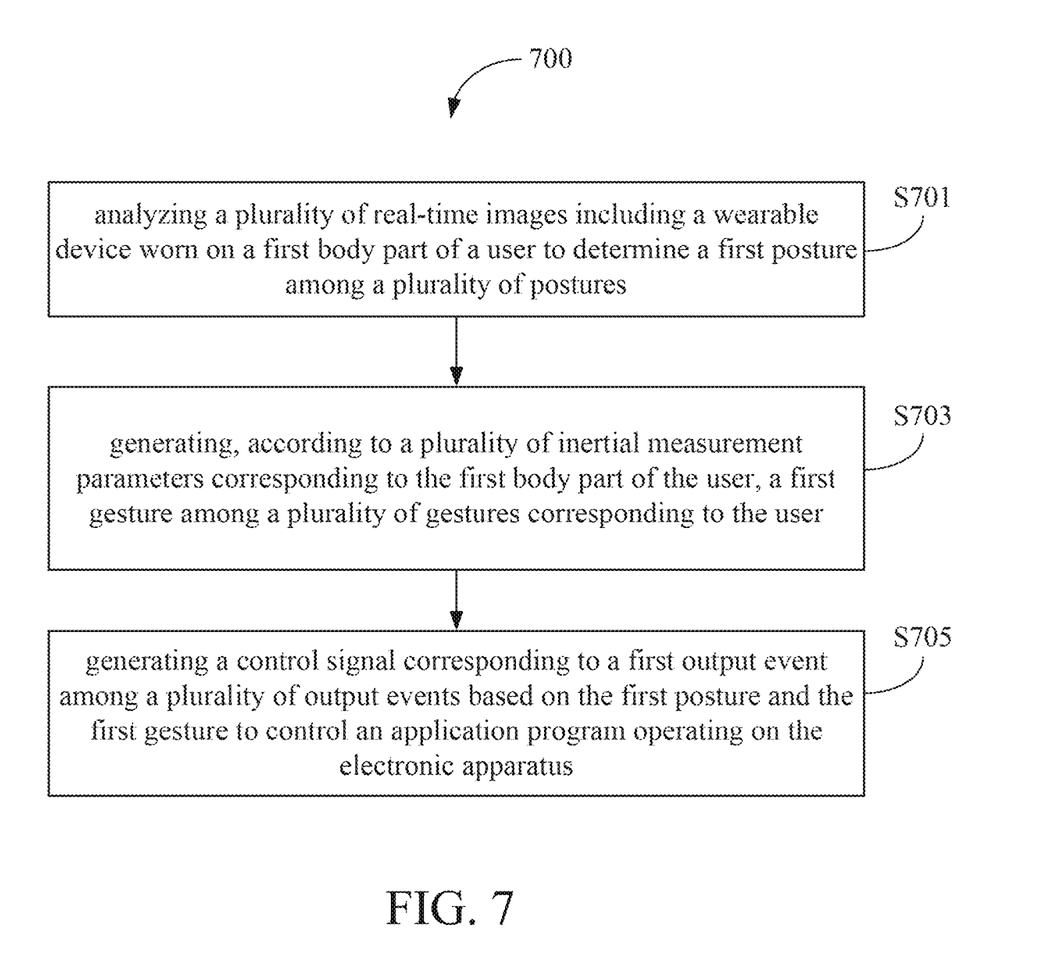
FIG. 7 is a partial flowchart depicting the controlling method of the second embodiment.

A second embodiment of the present disclosure is a controlling method and a flowchart thereof is depicted in FIG. 7. The controlling method 700 is adapted for an electronic apparatus (e.g., the head-mounted display 2 in the control signal generating system 1 described in the first embodiment). The controlling method 700 generates a control signal to control an application program operating on the electronic apparatus through the steps S701 to S705.

In the step S701, the electronic apparatus analyzes a plurality of real-time images including a wearable device worn on a first body part of a user to determine a first posture among a plurality of postures. Next, in the step S703, the electronic apparatus generates, according to a plurality of inertial measurement parameters corresponding to the first body part of the user, a first gesture among a plurality of gestures corresponding to the user.

Finally, in the step S705, the electronic apparatus generates a control signal corresponding to a first output event among a plurality of output events based on the first posture and the first gesture to control an application program operating on the electronic apparatus.

In some embodiments, wherein the step of analyzing the plurality of real-time images comprises: analyzing the real-time images to generate a plurality of spatial locations corresponding to a second body part of the user, wherein the spatial locations correspond to a plurality of time intervals; and calculating a posture tracking trajectory corresponding to the second body part of the user based on the time intervals and the spatial locations.

In some embodiments, wherein the step of analyzing the plurality of real-time images further comprises: comparing the posture tracking trajectory of the second body part of the user with the postures to determine the first posture.

In some embodiments, wherein the electronic apparatus further comprises: an image capturing device, being configured to capture the real-time images corresponding to a field of view, wherein the second body part of the user is included in the field of view.

In some embodiments, the controlling method 700 further comprises following steps: determining whether the postures have the first posture corresponding to the posture tracking trajectory; and in response to having the first posture corresponding to the posture tracking trajectory, generating the first gesture corresponding to the user.

In some embodiments, the control signal corresponding to the first output event is used to control the application program operating on the electronic apparatus, and the first output event corresponds to at least one of a password input operation or a mode switching operation.

In some embodiments, the head-mounted display comprises: an image capturing device, being configured to capture the real-time images corresponding to a field of view, wherein a second body part of the user is included in the field of view. Furthermore, the real-time images are analyzed to generate a plurality of spatial locations corresponding to the second body part of the user, and a posture tracking trajectory of the second body part of the user is generated based on the plurality of spatial locations and a plurality of time intervals corresponding to the plurality of spatial locations.

In some embodiments, the electronic apparatus is further configured to store an output event look-up table, and the output event look-up table is configured to indicate the postures and the gestures corresponding to the output events, and the controlling method 700 further comprises following steps: comparing the first posture and the first gesture with the output event look-up table to determine the first output event corresponding to the first posture and the first gesture; and generating the control signal corresponding to the first output event.

In some embodiments, the electronic apparatus further comprises: an eye tracker, being configured to generate an eye trajectory corresponding to the user. The controlling method 700 further comprises following steps: generating the control signal corresponding to the first output event among the output events based on the first posture, the first gesture, and the eye trajectory.

In addition to the aforesaid steps, the second embodiment can also execute all the operations and steps of the control signal generating system 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The controlling method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the head-mounted display 2), the computer program executes the controlling method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., body part, posture, gesture, and output event) are preceded by terms such as "first" or "second", and these terms of "first" or "second" are only used to distinguish these different words. For example, the "first" and "second" body parts are only used to indicate the body parts used in different operations.

According to the above descriptions, the controlling technology (at least including the head-mounted display, the method, and the non-transitory computer readable storage medium) provided by the present disclosure generates the corresponding posture and gesture by analyzing real-time images and inertial measurement parameters corresponding to a body part of the user. Next, the present disclosure may generate a control signal corresponding to the output event based on the corresponding posture and gesture. Since the present invention only requires the cooperative operation of the wearable device and the head-mounted display, the user does not need to hold the controller or operate the physical buttons on the controller. Therefore, the control signal generation technology provided by the present invention can improve the efficiency of the user inputting data or inputting control commands when the user wears the head-mounted display.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A head-mounted display, comprising:
an image capturing device, configured to capture a plurality of real-time images including a wearable device worn on a first body part of a user; and
a processor, coupled to the image capturing device, configured to:
determine a first posture among a plurality of postures based on the real-time images;
receive a plurality of inertial measurement parameters corresponding to the first body part from the wearable device;
generate a first gesture among a plurality of gestures corresponding to the user according to the inertial measurement parameters; and
generate a control signal corresponding to a first output event among a plurality of output events based on the first posture and the first gesture;
wherein the operation of determining the first posture comprises following operations:
comparing a posture tracking trajectory of a second body part of the user with the postures to determine the first posture.

2. The head-mounted display of claim 1, wherein the posture tracking trajectory is calculated by operations comprising:
analyzing the real-time images to generate a plurality of spatial locations corresponding to the second body part of the user, wherein the spatial locations correspond to a plurality of time intervals; and
calculating the posture tracking trajectory corresponding to the second body part of the user based on the time intervals and the spatial locations.

3. The head-mounted display of claim 1, wherein the real-time images captured by the image capturing device correspond to a field of view, and the second body part of the user is included in the field of view.

4. The head-mounted display of claim 1, wherein the processor is further configured to perform following operations:
determining whether the postures have the first posture corresponding to the posture tracking trajectory; and
in response to having the first posture corresponding to the posture tracking trajectory, generating the first gesture corresponding to the user.

5. The head-mounted display of claim 1, wherein the control signal corresponding to the first output event is used to control an application program operating on the head-mounted display, and the first output event corresponds to at least one of a password input operation or a mode switching operation.

6. The head-mounted display of claim 1, wherein the real-time images captured by the image capturing device correspond to a field of view, and a second body part of the user is included in the field of view,
wherein the real-time images are analyzed to generate a plurality of spatial locations corresponding to the second body part of the user, and a posture tracking trajectory of the second body part of the user is generated based on the plurality of spatial locations and a plurality of time intervals corresponding to the plurality of spatial locations.

7. The head-mounted display of claim 1, wherein the head-mounted display is further configured to store an output event look-up table, and the output event look-up table is configured to indicate the postures and the gestures corresponding to the output events, and the processor is further configured to perform following operations:
comparing the first posture and the first gesture with the output event look-up table to determine the first output event corresponding to the first posture and the first gesture; and
generating the control signal corresponding to the first output event.

8. The head-mounted display of claim 1, wherein the head-mounted display further comprises:
an eye tracker, being configured to generate an eye trajectory corresponding to the user,
wherein the processor is further configured to perform following operations:
generating the control signal corresponding to the first output event among the output events based on the first posture, the first gesture, and the eye trajectory.

9. The head-mounted display of claim 1, wherein the operation of generating the first gesture comprises following operations:
inputting the plurality of inertial measurement parameters into a convolutional neural network to generate the first gesture among the plurality of gestures corresponding to the user according to the inertial measurement parameters.

10. A controlling method, being adapted for use in an electronic apparatus, wherein the controlling method comprises:
analyzing a plurality of real-time images including a wearable device worn on a first body part of a user to determine a first posture among a plurality of postures;
generating, according to a plurality of inertial measurement parameters corresponding to the first body part of the user, a first gesture among a plurality of gestures corresponding to the user; and
generating a control signal corresponding to a first output event among a plurality of output events based on the first posture and the first gesture to control an application program operating on the electronic apparatus;

wherein analyzing the plurality of real-time images further comprises:

comparing a posture tracking trajectory of a second body part of the user with the postures to determine the first posture.

11. The controlling method of claim 10, wherein analyzing the plurality of real-time images comprises:

analyzing the real-time images to generate a plurality of spatial locations corresponding to the second body part of the user, wherein the spatial locations correspond to a plurality of time intervals; and calculating the posture tracking trajectory corresponding to the second body part of the user based on the time intervals and the spatial locations.

12. The controlling method of claim 11, wherein the electronic apparatus further comprises:

an image capturing device, being configured to capture the real-time images corresponding to a field of view, wherein the second body part of the user is included in the field of view.

13. The controlling method of claim 11, wherein the controlling method further comprises following steps:

determining whether the postures have the first posture corresponding to the posture tracking trajectory; and in response to having the first posture corresponding to the posture tracking trajectory, generating the first gesture corresponding to the user.

14. The controlling method of claim 10, wherein the control signal corresponding to the first output event is used to control the application program operating on the electronic apparatus, and the first output event corresponds to at least one of a password input operation or a mode switching operation.

15. The controlling method of claim 10, wherein the electronic apparatus comprises:

an image capturing device, being configured to capture the real-time images corresponding to a field of view, wherein a second body part of the user is included in the field of view, wherein the real-time images are analyzed to generate a plurality of spatial locations corresponding to the second body part of the user, and a posture tracking trajectory of the second body part of the user is generated based on the plurality of spatial locations and a plurality of time intervals corresponding to the plurality of spatial locations.

16. The controlling method of claim 10, wherein the electronic apparatus is further configured to store an output event look-up table, and the output event look-up table is configured to indicate the postures and the gestures corresponding to the output events, and the controlling method further comprises following steps:

comparing the first posture and the first gesture with the output event look-up table to determine the first output event corresponding to the first posture and the first gesture; and generating the control signal corresponding to the first output event.

17. The controlling method of claim 10, wherein the electronic apparatus further comprises:

an eye tracker, being configured to generate an eye trajectory corresponding to the user, wherein the controlling method further comprises following steps:

generating the control signal corresponding to the first output event among the output events based on the first posture, the first gesture, and the eye trajectory.

18. A non-transitory computer readable storage medium, having a computer program stored therein, wherein the computer program comprises a plurality of codes, the computer program executes a controlling method after being loaded into an electronic apparatus, the controlling method comprises:

analyzing a plurality of real-time images including a wearable device worn on a first body part of a user to determine a first posture among a plurality of postures;

generating, according to a plurality of inertial measurement parameters corresponding to the first body part of the user, a first gesture among a plurality of gestures corresponding to the user; and generating a control signal corresponding to a first output event among a plurality of output events based on the first posture and the first gesture to control an application program operating on the electronic apparatus;

wherein analyzing the plurality of real-time images further comprises:

comparing a posture tracking trajectory of a second body part of the user with the postures to determine the first posture.

* * * * *